United States Patent [19]
Koros et al.

[11] 4,341,554
[45] Jul. 27, 1982

[54] PROCESS FOR DESULFURIZING STEEL

[75] Inventors: Peter J. Koros, Pittsburgh, Pa.;
Robert G. Petrushka, Parma, Ohio

[73] Assignee: Jones & Laughlin Steel Incorporated, Pittsburgh, Pa.

[21] Appl. No.: 250,328

[22] Filed: Apr. 2, 1981

[51] Int. Cl.³ .............................................. C21C 7/02
[52] U.S. Cl. ........................................... 75/58; 75/53
[58] Field of Search ....................................... 75/53, 58

[56] References Cited
U.S. PATENT DOCUMENTS 3,885,957 5/1975 Richter .................................. 75/53
3,998,625 12/1976 Koros ................................... 75/53
4,036,635 7/1977 Klapdar ............................... 75/58
4,123,258 10/1978 Klapdar ............................... 75/58

*Primary Examiner*—Peter D. Rosenberg
*Attorney, Agent, or Firm*—John Stelmah

[57] ABSTRACT

A process for desulfurizing molten steel which includes the formation of a synthetic slag layer, the formation of a cover which occludes the ambient air, and the simultaneous injection of lime and a reactant agent which vaporizes within the molten steel.

8 Claims, 2 Drawing Figures

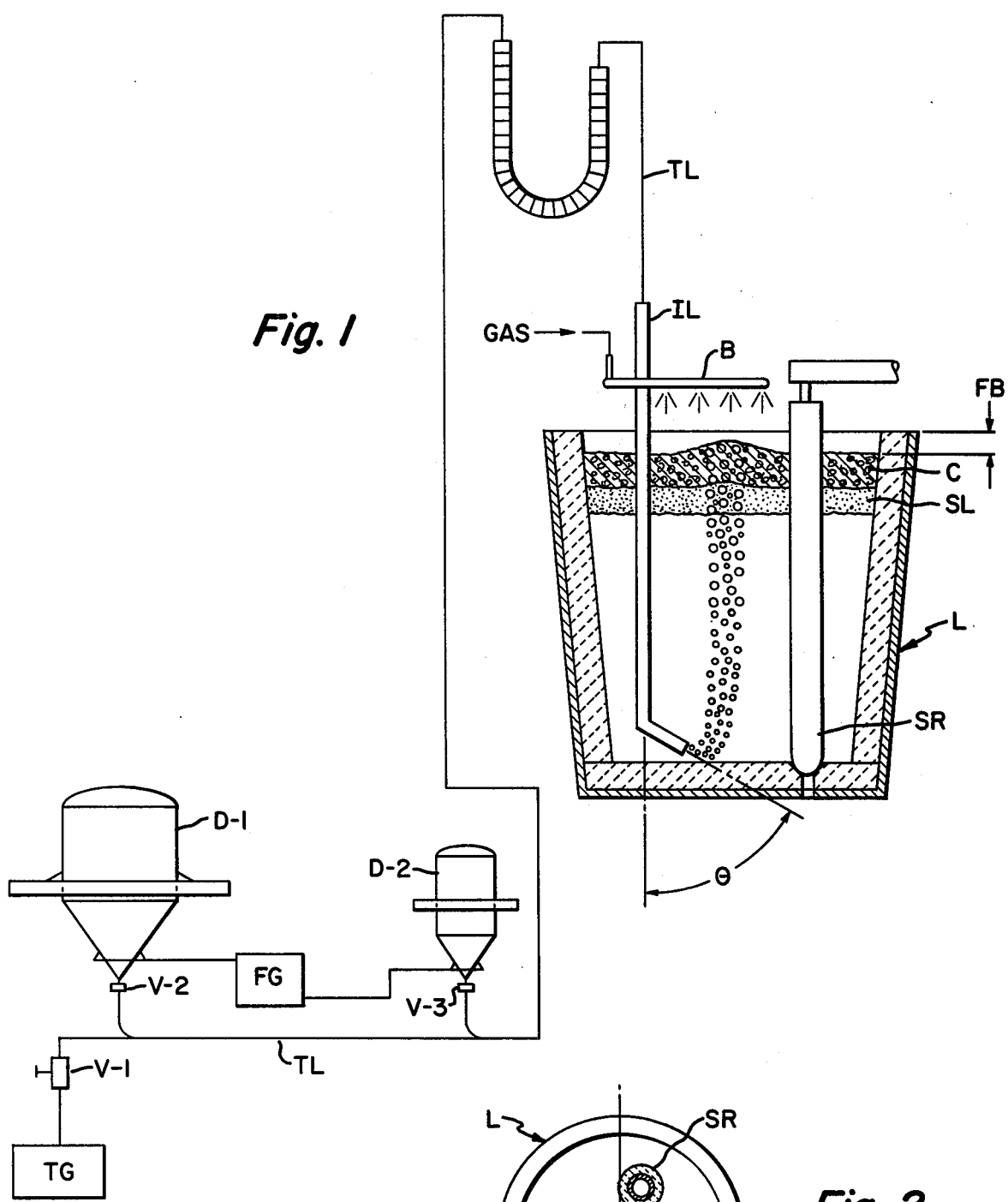

PROCESS FOR DESULFURIZING STEEL

BACKGROUND OF THE INVENTION

1. Field of the Invention

This invention relates to a process of deoxidizing and desulfurizing a steel melt and more particularly to the controlled addition of materials to the melt to enhance the deoxidizing and desulfurizing process.

2. Description of Prior Art

Some aspects of this invention involve some of the features disclosed and claimed in U.S. Pat. No. 3,998,625, which is owned by the assignee of this invention and which is incorporated by reference herein.

U.S. Pat. No. 3,998,625 discloses a desulfurization process in which a particulate non-oxidizing materials such as lime and particulate magnesium-containing material are separately fed from their respective storage means to form a fluidized mixture in a non-oxidizing carrier gas and this mixture is injected into a molten ferrous metal.

In copending and commonly assigned U.S. patent application Ser. No. 132,968, which is incorporated by reference herein, there is described a techique for maintaining desired gas flow pressures in a plurality of gas flow lines amongst multiple particulate material (desulfurizing agents) dispensing hopper vessels feeding into a common transport line feeding a lance immersed in molten metal.

U.S. Pat. No. 4,123,258 discloses a process in which a sulfur-containing steel metal is deoxidized, the deoxidized melt being treated with magnesium or with both magnesium and calcium as part of a purification action simultaneously reducing the sulfur content and the reaction is carried out in a casting ladle after the melt has been covered with a synthetic slag free from siliceous oxides.

U.S. Pat. No. 3,885,957 also discloses a process for desulfurizing a steel melt through the use of calcium containing substances and by protecting the surface of the melt with a particular slag composition, which may be a synthetic slag formed by depositing 75 percent (wt) calcium oxide and 25 percent (wt) calcium fluoride on the top of the melt. Another feature of U.S. Pat. No. 3,885,957 is the treating of the steel melt in a ladle lined with a refractory composition having a high aluminum oxide content, i.e., of at least 70 percent (wt). It is also indicated there that a slag layer having a thickness sufficient to prevent dislocation of the slag layer is not critical although the thickness may range from 20 mm. to 100 mm. (about 0.78 to 3.9 inches) without affecting the operation of the system in any way.

In an article entitled "DESULPHURIZATION OF STEEL IN THE LADLE BY STIRRING WITH A SYNTHETIC SLAG" in Revue de Metallurgic 1980 (8/9) 689–696, by P. Gugliermina, there is described what was considered to be the practical conditions for steel desulfurization by argon stirring in the presence of lime-containing slag. There it is indicated that it is risky to attempt a desulfurizing treatment lasting longer than 15-20 minutes, that it is necessary to limit the lime content of the slag, to add fluxes to it and to stir vigorously with argon. It is also indicated there that the spar addition is designed to retard the solidification of the slag covering the ladle and that a change in the procedure and timing of the addition of lime and spar will change the effectiveness of the spar addition such that a pile of lime and spar on a bed of already frozen slag will result in a substantial loss of temperature.

Neither U.S. Pat. No. 4,123,258 or U.S. Pat. No. 3,885,957 relate to, disclose, or suggest the use of lime only during one part of the processing and the use of lime in combination with a reactant agent such as magnesium and/or calcium silicon during another part of the processing. While U.S. Pat. No. 4,169,724 does disclose the use of a mixture of magnesium, lime, and fluorspar, it also fails to disclose or suggest the use of lime only during a part of the desulfurizing cycle of for the same purpose as in the present invention. The compositions of the prior art which utilize fluorspar as a constituent, in effective amounts, produce slags which are substantially fluid and hence not preferred for use in conjunction with the present invention.

It should also be noted that in the desulfurizing of steel in accordance with prior art procedures it is generally the practice to utilize "hard" or mechanical covers over the ladles in order to occlude oxygen from the ambient air and that such covers create special handling problems, particularly with ladles which employ stopper rods.

SUMMARY OF THE INVENTION

The present invention provides a method for deoxidizing and desulfurizing steel melt whereby more economical use is made of the reactant desulfurizing agent(s). The present invention also provides a method for deoxidizing and desulfurizing steel melt which obviates the need of a "hard" or mechanical cover.

The present invention was conceived for a use which was not originally contemplated for the two dispenser system as described in U.S. Pat. No. 3,998,625. An advantage taught in that patent is one of being able to vary the relative injection rates of lime and magnesium agents during a desulfurizing cycle in order to take account of the fact that the efficiency of magnesium desulfurization decreases as the sulfur content of the bath decreases. Accordingly, there is provided a dispenser system for in-line mixing of the constituents and wherein the ratio of the ingredients can be selectively varied. In the present invention a multiple dispenser system is utilized to dispense a single constituent during one part of the desulfurizing cycle and to provide in-line mixing of that constituent with another constituent during another part of the desulfurizing cycle for a purpose which will hereinafter be described.

The present invention provides a method for substantially sealing the top face of the molten steel in a desulfurizing vessel from exposure to the ambient air without the need of a mechanical cover. The present invention also provides a method for desulfurizing a steel melt with a substantial quiescent surface such as to minimize splashing and concomitantly reduce the freeboard space needed with the ladle.

To carry out the method according to the invention a steel melt to be deoxidized and desulfurized is preferably contained in a ladle lined with refractory having an aluminum oxide content of at least 70 percent (wt). The melt is covered with a layer of synthetic slag unto which is added lime in lump form, as contradistinct from powder form. At the reactant injection station for the ladle the slag layer is thickened by the addition of powdered lime only for a short interval of time prior to the injection of the primary desulfurizing agent(s). The combination of the lump and powdered lime produces a crust which serves as a seal towards oxygen from the ambient air entering into the steel melt. The primary desulfurizing reactant, which vaporizes under the pressure and temperature conditions of the melt, e.g., magnesium, or calcium introduced as calcium silicon, is injected into the melt in combination with additional lime. These reactants also act as deoxidizers. The reactant and powdered lime are simultaneously injected from separate pressurized dispensing vessels into the steel melt by virtue of the gas pressures within the dispensing vessels without the use of a separate transport gas in which the reactant and lime are entrained. The reactant and lime are literally "pushed" through the transport line and hence may be aptly described, for convenience, as being extruded.

The minimal use of conveying or transporting gases increases the dwell time of the reactants and lessens the amount of gases bubbling through the steel melt to the surface which might tend to disrupt the crust formed by the lime layer so as to permit oxygen and/or the contaminants to enter the steel melt. To enhance further the effectiveness of the seal on the surface of the steel melt there may be provided a gas shroud in the area where turbulence can be predicted to occur due to action of the gases within the steel melt bubbling to the surface. In the event the skin is ruptured the gas shroud will deter the ambient air from infiltrating the steel melt.

BRIEF DESCRIPTION OF THE DRAWINGS

In the drawings:

FIG. 1 is a diagrammatic view of a powder dispensing system similar to the type as disclosed in U.S. Pat. No. 3,998,6255 and as used in the method of this invention; and FIG. 2 is a schematic plan view of the treating ladle illustrated in FIG. 1.

DESCRIPTION OF PREFERRED EMBODIMENTS

The method of this invention is carried out with injection apparatus substantially in accordance with some of the aspects as disclosed in U.S. Pat. No. 3,998,625. In the present invention the mixture of lime and magnesium may be combined in-line as in U.S. Pat. No. 3,998,625 but is conveyed through the transport line in a different manner. Also the present invention is not limited to the use of magnesium as the reactant agent, other reactant agent, e.g., calcium silicon may be employed. While the present invention utilizes the operational flexibility of the apparatus of U.S. Pat. No. 3,998,625, such flexibility is additionally utilized in a mode which facilitates the carrying out of the significantly different features of the present invention, i.e., the selective transport of a single ingredient during a part of the treating cycle and the transport of ingredients as relatively viscous extrusions, as opposed to a completely fluidized stream conveyed by a separate transport gas.

The invention is further illustrated by the following description of preferred embodiments and tests made in conjunction with melts of 350 tons or greater. It will be understood by those skilled in the art that the amounts of and rates of injections of the lime and of the magnesium into smaller ladles will be modified from those described.

A heat of molten steel, having a sulfur level in the order of 0.010–0.025% (wt) sulfur, is tapped into a 350 net ton ladle L with a layer of slag SL which comprises about 10 lb. of furnace or synthetic slag per ton of steel. This amount of slag will generally provide a layer of slag which is 4 to 8 inches thick. During the tap a ladle addition of aluminum or other deoxidizing agent is made to compensate for the loss of deoxidizing agent that can generally be anticipated, which in the case of aluminum is the general order of 0.03% (wt).

Particulate line in granular or larger size (dustless), i.e. lump, crushed or pebble, granular, or pelletized, as defined in Bulletin 213 published by National Lime Association, is added to provide a cover C for the slag layer. This usually involves 1 to 3 tons of lime in pebble form. Bulletin 213 defines "granular lime" as the product that has a particulate size range of 100% passing a #8 sieve and 100% retained on a #80 sieve (a dustless product).

At the desulfurization station, the slag layer is further thickened by injecting powdered lime only, preferably for about 5 minutes to provide about 1,500 lbs. The powdered lime serves to provide a paste or crust filling the interstices between the stones of the pebble lime and forms a seal therewith to deter oxidation of the molten steel. The powdered lime is dispensed from dispenser D-1 through valve V-2 using a transport gas such as argon from source TG and controlled through valve V-1 to convey the lime which has been fluidized within the dispenser D-1 pressurized with a fluidizing gas FG such as nitrogen.

After the finely divided powder lime only injection phase is completed, the transport gas is turned off at valve V-1 and the valve V-3 leading from the desulfurizing agent dispenser D-2 is opened. The combination of the lime and desulfurizing reactant agent is conveyed to the injection lance by virtue of being pushed or extruded from the respective dispensers by the pressure of the gases within the dispensers. The discontinuation of the transport gas reduces the amount of bubbling that occurs during the injection of the combination and thereby increases the dwell time of the desulfurizing agent within the molten steel bath and increases the opportunity for the agent to react with the sulfur in the molten steel. Preferably, the lime is dispensed at a rate of about 150 to 200 lb/min. and the desulfurizing agent, in the form of magnesium, at the rate of about 7 to 12 lb/min. for a "blow time" of 10 to 20 minutes.

To deter the formation of a large quantity of bubbles which would tend to pass upwardly and contiguous to the injection lance IL in a manner such that the desulfurizing agent would rise quickly to the surface of the steel melt it is preferred to use a lance IL having a dog-leg portion. By "dog-leg" is meant a portion which bends away from the central axis of the injector lance, preferably at an angle $\phi$ of about 45 deg. It is also preferred (as may be observed in FIG. 2) that the lance be positioned to discharge at an angle $\phi$ of about 30 deg. To the longitudinal axis along a horizontal plane of the ladle to enhance the mixing action of the discharge materials with the steel melt.

Generally, the bubbles of gases in the steel melt will tend to rise in a vertical path upwardly from the discharge end of the injector lance. It has been observed in water-model tests that the particulate material is projected beyond the end of the ejector nozzle and forwardly into the liquid and that transport gas does not materially aid in the dispersment and mixing of the particulate material. It is believed that increased use of gas, such as transport gas, would simply create more bubbles and hence decrease the opportunity for the particulates to rise to the surface of the melt without complete reaction with the sulfur in the melt. In the process of this invention sufficient projection of the particulate desulfurizing agent occurs without the use of a separate transport gas.

To further decrease the opportunity for the ambient air to contact the molten steel in the ladle, in the event the lime cover C or crust is ruptured by rising gases, means is provided to create a shroud or blanket of gases in the region where the gas bubbles would most likely surface, i.e., vertically upwardly from the discharge orifice of the injector nozzle. In FIG. 2 the shroud creating means is illustrated as being in the form of a ring type gas burner B which will generate a blanket of gases to preferably cover an area of about 9 sq. ft. However, it will be understood that any suitable means which will generate a shroud or blanket of neutral gas may be employed.

The use of a ladle which relies upon the use of a stopper rod SR to control pouring creates a spatial environment wherein the use of a solid or mechanical ladle cover makes handling difficult and is time consuming. It was the attempt to obviate this problem which led to the development of some of the features of this invention, which features are also to be found to be useful in conjunction with other ladles.

In developing the process of this invention several preliminary test heats were made to try and establish suitable parameters. From these preliminary heats it was determined that desulfurization of steel melts to a $\leq 0.008\%$ sulfur level could be accomplished with minimal free board space and without the use of a hard ladle cover through the use of: (1) a ladle lined with $\geq 70\%$ alumina refractory; (2) pebble lime over the slag to provide cover and increase slag basicity; (3) a minimum ladle temperature of 2860 deg. F. (1571 deg. C.); (4) injector lance discharge in off-set position in respect to ladle to enhance stirring; (5) a lime flow rate of 170–200 lb/min. and a magnesium flow rate of 8–10 lb/min. (using gas flow from pressurized tanks only with no separate transport gas) with a blow time of about 10 to 20 minutes; and (6) use of a natural gas shroud to form a blanket in event of a break-through in the lime cover.

In the Table are tabulated the statistics of 16 tests made after the preliminary tests described above. Of the 16 test runs, 9 were unsuccessful toward meeting a final sulfur content of $\leq 0.008\%$ for the reasons indicated below the Table keyed to the unsuccessful runs. It will be observed that the 9 unsuccessful tests include 6 tests which were aborted early because of mechanical failures or loss of temperature. However, the remaining 7 tests establish the validity of the process for reducing the sulfur level of molten steel in a $\leq 0.008\%$ sulfur level.

Although actual tests have not been conducted in respect to the use of lime and calcium silicon (Ca Si), it is anticipated that injection of Ca Si at a rate of 49 lb/min. will generate substantially the same degree of turbulence, due to bubbling of gases, as the injection of magnesium at a rate of about 9 lb/min.

In the known desulfurizing process wherein Ca Si alone is employed the typical rate of injection is 100 to 120 lb/min. This high rate of injection produces a violent reaction in the melt such that a relatively large free board space in the ladle above the melt must be provided and requires the use of mechanical cover to control slopping.

With the process of this invention wherein lime and Ca Si are co-jointly injected into the melt the rate of injection of the Ca Si may be in the order of 45 to 55 lb/min. For a melt of 280 net tons of steel, it can be expected that about 200 to 300 lbs. of Ca Si (4.5–5.5 lb/min.) and about 1000–1300 lbs. of lime (6–8 lb/min.) would be required in a desulfurizing process wherein gas generation can be expected to be about the same as that generated in the lime-magnesium process of this invention.

Thus, it will be noted in the process of the present invention the rate of injection is approximately half of that as employed in systems wherein Ca Si is injected without lime, the need for free board space is substantially reduced and the need for a solid cover eliminated.

TABLE

| Test | Melt Net Tons | Tap | Sulfur Start | Finish | Time(min) | Lime Lbs. | Lbs/Min | Time(min) | Mg. Lbs. | Lbs/Min |
|---|---|---|---|---|---|---|---|---|---|---|
| 44 | 350 | 0.015 | 0.013 | 0.005 | 24 | 4700 | 196 | 21 | 214 | 10.2 |
| 45 | 350 | 0.015 | 0.009 | 0.005 | 27 | 5000 | 185 | 23 | 285 | 12.4 |
| 46 (1) | 350 | 0.018 | 0.014 | 0.011 | 25 | 3985 | 159 | 21 | 213 | 10.1 |
| 47 (2) | 350 | 0.015 | 0.013 | 0.009 | 19 | 3401 | 179 | 17 | 214 | 12.6 |
| 48 | 350 | NA | 0.014 | 0.006 | 23 | 4308 | 187 | 18 | 143 | 7.9 |
| 49 | 350 | 0.011 | 0.012 | 0.005 | 28 | 5130 | 183 | 27 | 235 | 8.7 |
| 50 | 381 | 0.014 | 0.015 | 0.008 | 19 | 3580 | 188 | 17 | 120 | 7.1 |
| 51 (3) | 370 | 0.013 | 0.013 | 0.010 | 22 | 3563 | 162 | 20 | 0 | 6.4 |
| 52 (4) | 357 | 0 | 0 | 0 | 0 | 0 | 0 | 0 | 0 | 0 |
| 53 (4) | 372 | 0 | 0 | 0 | 4 | 120 | 30 | 0 | 0 | 0 |
| 54 (4) | 365 | 0.021 | 0.017 | 0.013 | 18 | 3218 | 179 | 12 | 100 | 8.3 |
| 55 | 371 | 0.014 | 0.014 | 0.007 | 22 | 4870 | 221 | 21 | 297 | 14.1 |
| 56 (4) | 380 | 0.019 | 0.013 | 0.010 | 14 | 2050 | 146 | 7 | 83 | 11.9 |
| 57 (4) | 380 | 0.016 | 0.010 | 0.005 | 13 | 2050 | 158 | 2 | 45 | 22.5 |
| 58 (4) | 350 | 0.013 | 0.013 | 0.013 | 0 | 0 | 0 | 0 | 0 | 0 |
| 59 | 380 | 0.013 | 0.009 | 0.005 | 22 | 4570 | 208 | 15 | 195 | 13.0 |

(1) Lance burned off
(2) Gas shroud not used
(3) Lime flow erratic/partially clogged line
(4) Aborted early due to one of:
 a. Totally clogged lime line
 b. Lance failure
 c. Loss of temperature

What is claimed is:
1. In a process for desulfurizing steel melt which includes the steps of:
 (a) covering said melt with a synthetic slag layer;
 (b) injecting powdered lime into said melt; and
 (c) adding a desulfurizing reactant agent which vaporizes under the pressure and temperature conditions within said melt;

the improvement characterized by the steps of:
- (d) adding particulate lime to cover said synthetic slag, said particulate lime being in a form and size such that substantially 100% will be retained on a number 80 sieve
- (e) conducting step (b) after step (d) and permitting the powdered lime to rise to the surface of said melt and form together with said pebble lime a crust which deters entry of ambient air into said melt; and
- (f) adding the agent of step (c) by simultaneously extruding into said melt from separate pressurized dispensing vessels (1) powdered lime and (2) said agent.

2. The process as described in claim 1, wherein: said desulfurizing agent is magnesium.

3. The process as described in claim 1, wherein: step (c) is conducted for 2 to 4 minutes.

4. The process as described in claim 1, wherein: the lime and desulfurizing reactant agent of step (d) are injected into said melt at rates which will not disrupt the crust formed by step (c).

5. The process as described in claim 1, wherein: the lime of step (d) is provided at the rate of 150 to 200 lb/min., and the desulfurizing agent is magnesium provided at a rate of 7 to 12 lb/min.

6. The process as described in claim 1, wherein: said desulfurizing reactant agent is calcium silicon.

7. The process as described in claim 1, wherein: said lime and desulfurizing agent are projected into said steel melt via a lance extending through said synthetic slag layer with a curtain of gas shrouding the area of turbulence caused by gases attempting to bubble through said crust.

8. The process as described in claim 1, wherein: said lime and desulfurizing agent are projected into said steel melt via a vertically disposed lance having a nozzle portion extending in an inclined direction from the vertical axis of the lance, said lance being positioned off-center of a horizontal axis of the ladle and with the nozzle discharge port positioned to project the stream of lime and reactant agent in a direction generally tangential to the wall of the ladle.

* * * * *